Patented July 12, 1932

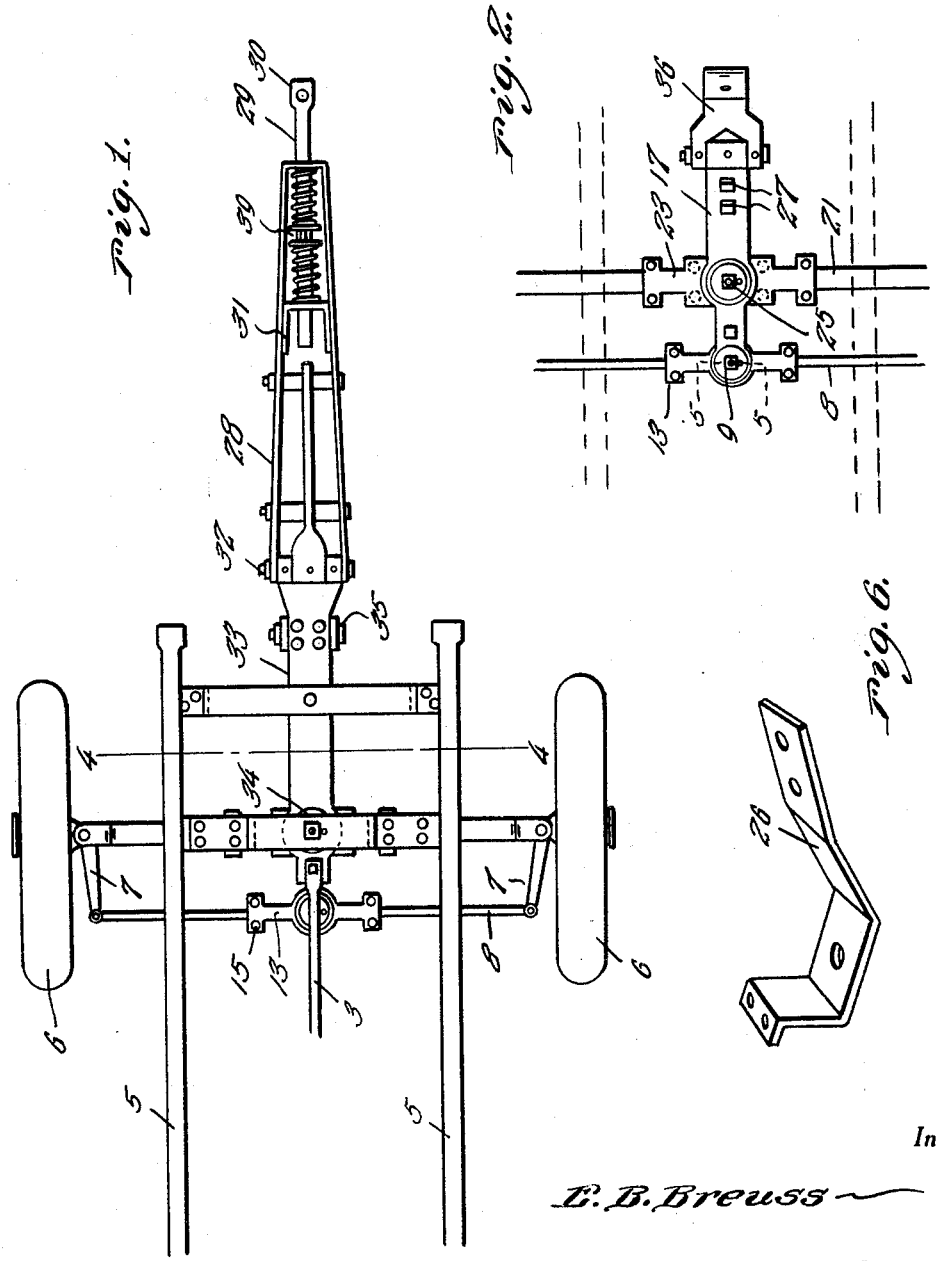

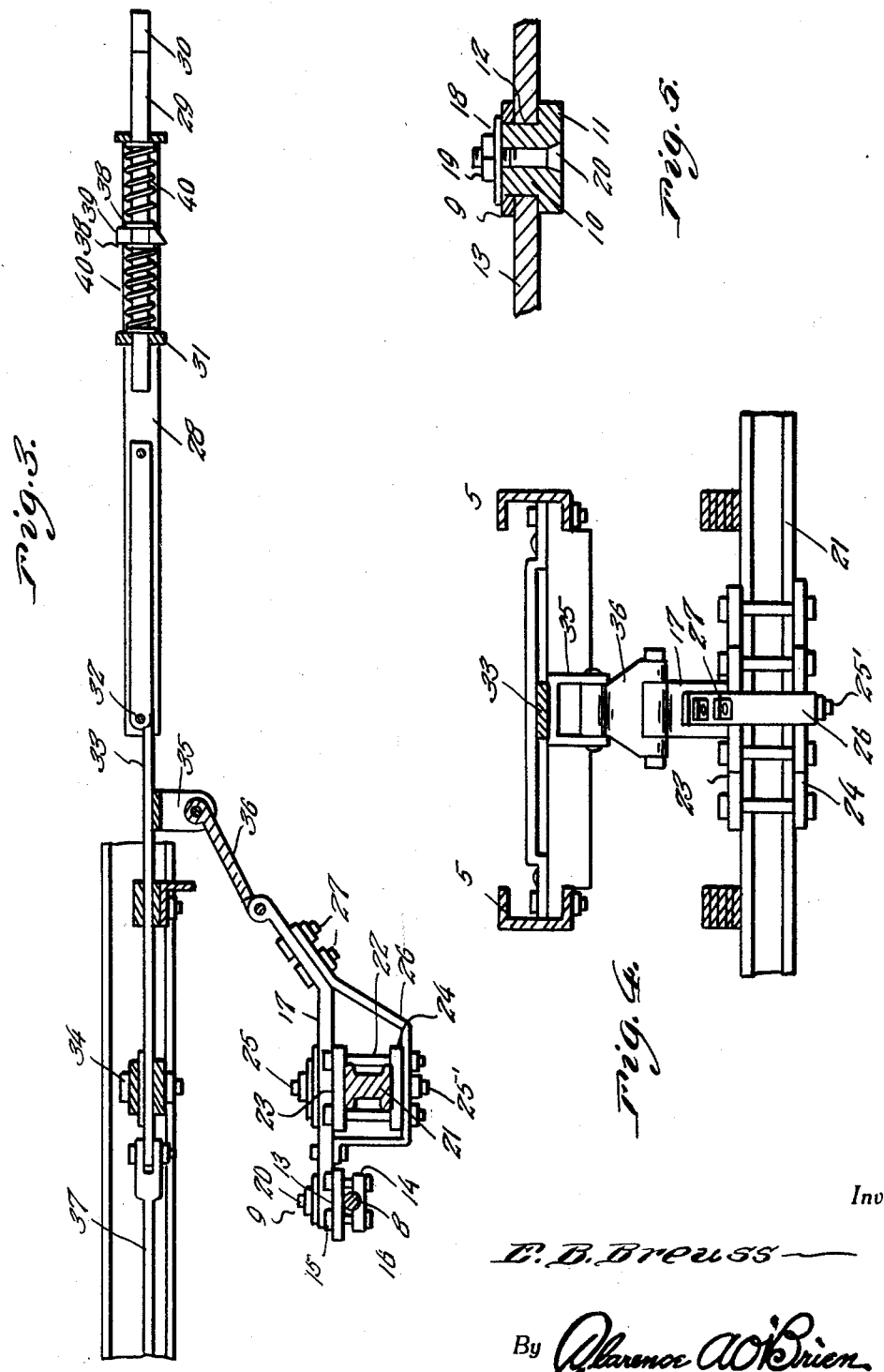

1,866,796

UNITED STATES PATENT OFFICE

EDWARD B. BREUSS, OF WILLOWS, CALIFORNIA

TRAILER HITCH

Application filed November 1, 1930. Serial No. 492,853.

This invention appertains to new and useful improvements in hitches for trailers, the same having as its principal object the provision of means for preventing swinging laterally the trailed vehicle.

Another important object of the invention is to provide a trailer hitch which because of its simple construction can be manufactured at low cost and because of its durable construction can be manufactured and used indefinitely.

Other objects and advantages of the invention can be apprehended in the following specification.

In the drawings:—

Figure 1 represents a top plan view of the novel hitch shown attached to the steering mechanism of the trailed vehicle.

Fig. 2 represents a fragmentary top plan view of the connection between the hitch and the trailed vehicle steering mechanism.

Fig. 3 represents a longitudinal sectional view taken substantially on a line passing through the longitudinal center of Figure 1.

Fig. 4 represents a cross sectional view of the mechanism taken substantially on the line 4—4 of Fig. 1.

Fig. 5 represents a fragmentary sectional view taken substantially on the line 5—5 of Fig. 2.

Fig. 6 represents a perspective view of a brace member.

Referring to the drawings wherein like numerals designate like parts, it can be seen that numerals 5—5 represent the side chassis bar of the wheeled vehicle, while numerals 6 represent the wheels to be steered. These wheels 6 are located on the stub shafts from which the knuckle arms 7 project and these arms 7 are connected together by the tie rods 8 on which the pivot structure generally referred to by numeral 9 in Fig. 5 is located.

As is clearly shown in Figs. 1, 2, 3 and 5, the pivot structure includes a cylindrical body 10 having a head 11 at its lower end. The cylindrical body 10 is disposed through the opening 12 in the top plate 13, which is complementary to the bottom plate 14, these plates being secured together by bolts and nuts 15 and 16 respectively.

An elongated bar 17 has one end provided with an opening for receiving the aforementioned body 10 at its upper end and this body is prevented from being displaced from the plate 13 by washer and nut assembly 18 and 19 respectively, on the bolt 20.

As is clearly shown in Fig. 3, numeral 21 represents the usual front axle bar and clamped against the top and bottom of this bar 21 by the bolts 22 are the plates 23 and 24 respectively.

Mounted upon this plate 23 is the pivot structure including the pin 25, which serves as the fulcrum for the bar 17. A brace bar 26 is secured at one end by the elements 27 to the bar 17, and at its intermediate portion is disposed beneath the plate 24 and provided with an opening to receive the lower end of the pin 25' depending from the plate 24. The other end of the bar 26 is secured to the bar 27 rearwardly of the pivot pin 25.

Fig. 1 shows the elongated narrow frame 28 of U-shape provided with an opening at its bight portion to slidably receive the rod 29 which is provided with an eye 30 at its forward end. This bar 29 is slidably disposed through the bracket 31 mounted within the frame 28, while the free ends of the frame 28 are hingedly connected as at 32, and to the swingable bar 33 on the pivot structure 34.

A connector 35 is rigidly secured to the bar 33 and a link member 36 is interposed between the connector 35 and the aforementioned bar 17. The bar 33 connects to a rod 37 which can lead to additional steering means located rearwardly of the steerable wheels shown in the drawings.

Referring to the rod 29, it can be seen that the same has a pair of washers 38 slidable thereon and separated by the wedge member 39, disposed through an opening in the intermediate portion of the bar 39. Springs 40 are interposed between the aforementioned washers 38 and the bracket 31 and bight portion of the frame 28 so as to equalize the position on the rod 29.

While the foregoing specification sets forth the invention in definite terms, it is to be understood that numerous changes in the shape, size, and materials may be resorted to without departing from the spirit and scope of the invention as claimed hereinafter.

Having thus described my invention, what I claim as new is:—

In combination with a vehicle including its chassis, the front axle and the rod which connects the steering knuckles together, upper and lower plates fastened to the central part of the axle, vertically alined pivot bushings in said plates, a bar having a hole therein for receiving the top bushing, a reinforcing bar connected with the first bar and connected thereto forwardly and rearwardly of the axle, said reinforcing bar having an opening therein for receiving the lower bushing, means for connecting the bushings to the bars, a clamp on the connecting rod, a pivot bushing carried thereby and the end of the first bar having an opening therein for receiving a bushing, means for connecting said end of the bar to the bushing, a second bar pivotally connected to the front part of the chassis for movement about a vertical axis, the pivotal point being in alinement with the pivot bushing connected with the axle, means for slidably supporting the front end of the second bar, a frame pivotally connected with the front end of the second bar for movement about a horizontal axis, a draw bar yieldably supported in the frame, and a link pivotally connected to the front end of the first bar and to a part of the front portion of the second bar.

In testimony whereof I affix my signature.

EDWARD B. BREUSS.